United States Patent
Wang et al.

(10) Patent No.: US 11,972,601 B2
(45) Date of Patent: Apr. 30, 2024

(54) METHOD FOR SELECTING IMAGE SAMPLES AND RELATED EQUIPMENT

(71) Applicant: Ping An Technology (Shenzhen) Co., Ltd., Shenzhen (CN)

(72) Inventors: Jun Wang, Shenzhen (CN); Peng Gao, Shenzhen (CN)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 402 days.

(21) Appl. No.: 17/614,070

(22) PCT Filed: Aug. 28, 2020

(86) PCT No.: PCT/CN2020/112238
§ 371 (c)(1),
(2) Date: Nov. 24, 2021

(87) PCT Pub. No.: WO2021/135330
PCT Pub. Date: Jul. 8, 2021

(65) Prior Publication Data
US 2022/0230417 A1    Jul. 21, 2022

(30) Foreign Application Priority Data
Jul. 28, 2020    (CN) .......................... 202010739700.8

(51) Int. Cl.
*G06V 10/774* (2022.01)
*G06N 3/084* (2023.01)
(Continued)

(52) U.S. Cl.
CPC .......... *G06V 10/774* (2022.01); *G06N 3/084* (2013.01); *G06V 10/25* (2022.01); *G06V 10/267* (2022.01);
(Continued)

(58) Field of Classification Search
CPC .... G06V 10/82; G06V 10/7715; G06T 11/00; G06T 15/205
See application file for complete search history.

(56) References Cited

U.S. PATENT DOCUMENTS 8,442,304 B2 * 5/2013 Marrion ............... G06V 20/653
382/294
8,553,037 B2 * 10/2013 Smith .................. G06T 13/40
345/473
(Continued)

FOREIGN PATENT DOCUMENTS

| CN | 105956612 | 9/2016 |
|---|---|---|
| JP | 2020-58590 | 4/2020 |

OTHER PUBLICATIONS

Shunsuke Tsukatant, et al.;Active Learning Based on Self-supervised Feature Learing; The Institute of Electronics, Information and Communication Engineers; vol. 119, No. 192,pp. 115-119 (PRMU2019-28); Sep. 2019.

*Primary Examiner* — Yosef Kassa
(74) *Attorney, Agent, or Firm* — ScienBiziP, P.C.

(57) ABSTRACT

The present disclosure relates to a technology field of artificial intelligence and provides a method for selecting image samples and related equipment. The method trains an instance segmentation model with first image samples and trains a score prediction model with third image samples. An information quantum score of second image samples is calculated through the score prediction model and feature vectors extracted. The second image samples are clustered according to the feature vectors of the second image samples and sample clusters of the second image samples are obtained. Target image samples are selected from the second image samples according to the information quantum score of the second image samples and the sample clusters. Target (Continued)

image samples from the image samples are selected for labelling, improving an accuracy of sample selection.

20 Claims, 3 Drawing Sheets

(51) Int. Cl.
    *G06V 10/25*     (2022.01)
    *G06V 10/26*     (2022.01)
    *G06V 10/762*     (2022.01)
    *G06V 10/77*     (2022.01)
    *G06V 10/80*     (2022.01)
    *G06V 10/82*     (2022.01)
    *G06V 20/70*     (2022.01)

(52) U.S. Cl.
    CPC ........ *G06V 10/763* (2022.01); *G06V 10/7715* (2022.01); *G06V 10/806* (2022.01); *G06V 10/82* (2022.01); *G06V 20/70* (2022.01)

(56) References Cited

U.S. PATENT DOCUMENTS

| | | | |
|---|---|---|---|
| 10,167,259 B2 * | 1/2019 | Osmulski | A61K 31/69 |
| 10,318,827 B2 * | 6/2019 | Jia | G06V 40/103 |
| 10,755,428 B2 * | 8/2020 | Aswin | G06N 3/0418 |
| 10,956,721 B2 * | 3/2021 | Tusch | G06V 20/52 |

* cited by examiner

METHOD FOR SELECTING IMAGE SAMPLES AND RELATED EQUIPMENT

CROSS-REFERENCE TO RELATED APPLICATIONS

This application claims priority of Chinese Patent Application No. 202010739700.8, entitled "method for selecting image samples and related equipment" filed on Jul. 28, 2020 in the China National Intellectual Property Administration (CNIPA), the entire contents of which are incorporated by reference herein.

FIELD

The present disclosure relates to a technical field of artificial intelligence, specifically a method for selecting image samples, a device for selecting image samples, a computing device, and a computer-readable storage medium.

BACKGROUND

In artificial intelligence, it is often necessary to recognize instances in images. For example, teachers, students, desks, etc. are recognizable in teaching images. For another example, areas of lesions are recognizable in medical images.

Annotated image samples can be used to train an instance segmentation model, and the instances in an image can be recognized through the trained instance segmentation model. Labelling of image samples needs to be performed by professionals. However, if image samples are not carefully selected, even if labelers are very experienced, a training effect of the instance segmentation model will be poor.

Selecting image samples with good training effects for labelers to label is problematic.

SUMMARY

In view of the above, it is necessary to provide a method for selecting image samples, a device for selecting image samples, a computing device, and a computer-readable storage medium, which can select suitable target image samples from the image samples to be labeled.

A first aspect of the present disclosure provides a method for selecting image samples. The method includes:

Obtaining a plurality of first image samples labeled with an instance, a plurality of second image samples yet to be labeled with an instance, and a plurality of third image samples labeled with a score;

Constructing an instance segmentation model, the instance segmentation model including a first feature pyramid networks backbone network, a first region generation network, and a three-branch network;

Training the instance segmentation model with the plurality of first image samples;

Constructing a score prediction model, the score prediction model including a second FPN backbone network sharing parameters and network structure with the first FPN backbone network, a second region generation network sharing parameters and network structure with the first region generation network, and a score prediction network;

Training the score prediction model with the plurality of third image samples;

Calculating an information quantum score of the plurality of second image samples through the score prediction model;

Extracting feature vectors of the plurality of second image samples;

Clustering the plurality of second image samples according to the feature vectors and obtaining a plurality of sample clusters of the plurality of second image samples;

Selecting a plurality of target image samples from the plurality of second image samples according to the information quantum score and the plurality of sample clusters.

A second aspect of the present disclosure provides a device for selecting image samples. The device includes the following elements:

An acquisition module obtains a plurality of first image samples labeled with an instance, a plurality of second image samples yet to be labeled with an instance, and a plurality of third image samples labeled with a score;

A first construction module constructs an instance segmentation model, the instance segmentation model including a first feature pyramid networks backbone network, a first region generation network, and a three-branch network;

A first training module trains the instance segmentation model with the plurality of first image samples;

A second construction module constructs a score prediction model, the score prediction model including a second FPN backbone network sharing parameters and network structure with the first FPN backbone network, a second region generation network sharing parameters and network structure with the first region generation network, and a score prediction network;

A second training module trains the score prediction model with the plurality of third image samples;

A first calculation module calculates an information quantum score of the plurality of second image samples through the score prediction model;

A second calculation module extracts feature vectors of the plurality of second image samples;

A clustering module clusters the plurality of second image samples according to the feature vectors and obtains a plurality of sample clusters of the plurality of second image samples;

A selection module selects a plurality of target image samples from the plurality of second image samples according to the information quantum score and the plurality of sample clusters.

A third aspect of the present disclosure provides a computing device, which includes a processor, the processor can execute computer-readable instructions stored in a memory to implement the following steps:

Obtaining a plurality of first image samples labeled with an instance, a plurality of second image samples yet to be labeled with an instance, and a plurality of third image samples labeled with a score;

Constructing an instance segmentation model, the instance segmentation model including a first feature pyramid networks backbone network, a first region generation network, and a three-branch network;

Training the instance segmentation model with the plurality of first image samples;

Constructing a score prediction model, the score prediction model including a second FPN backbone network sharing parameters and network structure with the first FPN backbone network, a second region generation network sharing parameters and network structure with the first region generation network, and a score prediction network;

Training the score prediction model with the plurality of third image samples;

Calculating an information quantum score of the plurality of second image samples through the score prediction model;

Extracting feature vectors of the plurality of second image samples;

Clustering the plurality of second image samples according to the feature vectors and obtaining a plurality of sample clusters of the plurality of second image samples;

Selecting a plurality of target image samples from the plurality of second image samples according to the information quantum score and the plurality of sample clusters.

A fourth aspect of the present disclosure provides a computer-readable storage medium having stored computer-readable instructions thereon, wherein the computer-readable instructions implement the following steps when executed by a processor:

Obtaining a plurality of first image samples labeled with an instance, a plurality of second image samples yet to be labeled with an instance, and a plurality of third image samples labeled with a score;

Constructing an instance segmentation model, the instance segmentation model including a first feature pyramid networks backbone network, a first region generation network, and a three-branch network;

Training the instance segmentation model with the plurality of first image samples;

Constructing a score prediction model, the score prediction model including a second FPN backbone network sharing parameters and network structure with the first FPN backbone network, a second region generation network sharing parameters and network structure with the first region generation network, and a score prediction network;

Training the score prediction model with the plurality of third image samples;

Calculating an information quantum score of the plurality of second image samples through the score prediction model;

Extracting feature vectors of the plurality of second image samples;

Clustering the plurality of second image samples according to the feature vectors and obtaining a plurality of sample clusters of the plurality of second image samples;

Selecting a plurality of target image samples from the plurality of second image samples according to the information quantum score and the plurality of sample clusters.

The present disclosure obtains a plurality of first image samples labeled with an instance, a plurality of second image samples yet to be labeled with an instance, and a plurality of third image samples labeled with a score, and constructs an instance segmentation model. The instance segmentation model includes a first FPN backbone network, a first region generation network, and a three-branch network. The instance segmentation model is trained with the plurality of first image samples. A score prediction model is constructed, and the score prediction model includes a second FPN backbone network sharing parameters and network structure with the first FPN backbone network, a second region generation network sharing parameters and network structure with the first region generation network, and a score prediction network. The score prediction model is trained with the plurality of third image samples. An information quantum score of the plurality of second image samples is calculated through the score prediction model. Feature vectors of the plurality of second image samples are extracted. The plurality of second image samples is clustered according to the feature vectors of the plurality of second image samples and a plurality of sample clusters of the plurality of second image samples are obtained. Target image samples are selected from the plurality of second image samples according to the information quantum score and the plurality of sample clusters. The present disclosure selects target image samples from the image samples to be labeled for labelling, improving an accuracy of sample selection.

DETAILED DESCRIPTION

In order to be able to understand objects, features, and advantages of the present disclosure more clearly, the present disclosure will be described in detail below with reference to the drawings and specific embodiments. It should be noted that the embodiments in the present disclosure and the features in the embodiments may be combined with each other without conflict.

In the following description, numerous specific details are set forth in order to provide a full understanding of the present disclosure. Described embodiments are merely embodiments which are a part of the present disclosure, rather than all possible embodiments. All other embodiments obtained by those of ordinary skill in the art based on the embodiments of the present disclosure without creative efforts are within the scope of the claims.

Unless defined otherwise, all technical and scientific terms herein have the same meaning as used in the field of the art technology as generally understood. The terms used in the present disclosure are for the purposes of describing particular embodiments and are not intended to limit the present disclosure.

Optionally, the method for selecting image samples of the present disclosure can be applied to one or more computing devices. A computing device is any device capable of automatically performing numerical calculation and/or information processing according to an instruction set or stored in advance, and the hardware thereof includes, but is not limited to, a microprocessor, an application specific integrated circuit (ASIC), a field-programmable gate array (FPGA), a digital signal processor (DSP), or an embedded device, etc.

The present disclosure can be used in many general or special computer system environments or configurations. For example: personal computers, server computers, hand-held devices or portable devices, tablet devices, multiprocessor systems, microprocessor-based systems, set-top boxes, programmable consumer electronic devices, network PCs, small computers, large computers, including distributed computing environments for any of the above systems or equipment, etc. The present disclosure generally applies in the context of computer-executable instructions executed by a computer, such as a program module. Generally, program modules include routines, programs, objects, components, data structures, etc. that perform specific tasks or implement specific abstract data types. The present disclosure can also be practiced in distributed computing environments. In these distributed computing environments, tasks are performed by remote processing devices connected through a communication network. In a distributed computing environment, program modules can be located in both a local and a remote computer storage media including storage devices.

The computing device may be a desktop computer, a notebook, a palmtop computer, and a cloud server. The computing device can perform a human-computer interaction with a user through a keyboard, a mouse, a remote controller, a touch panel, or a voice control device.

Embodiment One

Figure 1:
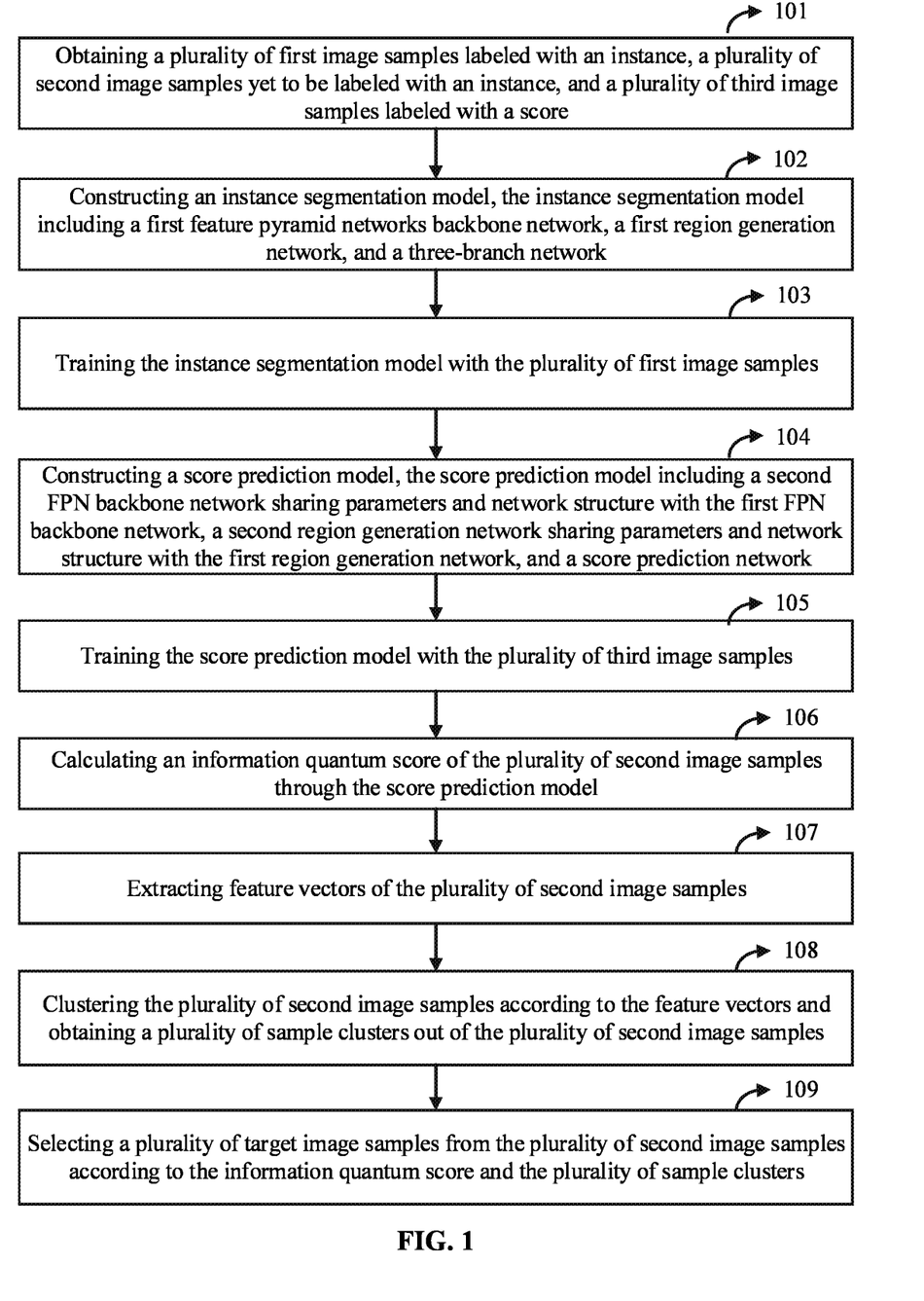
FIG. 1 shows a schematic flow chart of a method for selecting image samples provided by an embodiment of the present disclosure.

FIG. 1 shows a schematic flow chart of a method for selecting image samples provided in a first embodiment of the present disclosure. The method for selecting image samples is applicable in a computing device, and selects target image samples from image samples to be labeled.

The method for selecting image samples specifically includes the following steps. According to different requirements, the order of the steps in the flow chart may be changed, and some steps may be omitted.

In block 101, obtaining a plurality of first image samples labeled with an instance, a plurality of second image samples yet to be labeled with an instance, and a plurality of third image samples labeled with a score.

The plurality of first image samples, the plurality of second image samples, and the plurality of third image samples can be read from a database.

The plurality of first image samples, the plurality of second image samples, and the plurality of third image samples uploaded by a user can be received.

A number of the plurality of first image samples is small, and unlabeled first image samples are not selected. When the plurality of first image samples are used for pre-training, a larger number of first image samples are required to achieve an acceptable training effect.

An instance labeling requires a labeler to apply a label to a label type, a label box, and a label mask of the first image sample.

A score labeling requires a labeler to label a classification labeling score, a box labeling score, a mask labeling score, and an instance number labeling score of the third image sample. The instance number labeling score is a number of instances in the third image sample.

In block 102, constructing an instance segmentation model, the instance segmentation model including a first feature pyramid networks backbone network, a first region generation network, and a three-branch network.

The feature pyramid networks (FPN) includes bottom-up sub-networks or top-down sub-networks. A bottom-up sub-network of the first FPN backbone network is used to perform feature extraction on images to obtain a plurality of image feature representations of different feature levels. A top-down sub-network of the first FPN backbone network is used to combine the plurality of image feature representations of different feature levels to calculate a feature representation of the image.

The first region generation network includes a region proposal network (RPN), a RoIAlign network, etc., and is used to generate a region of interest (interesting region) of an image.

In block 103, training the instance segmentation model with the plurality of first image samples.

In a specific embodiment, the training of the instance segmentation model with the plurality of first image samples includes:

For each first image sample of the plurality of first image samples, inputting the first image sample into the first FPN backbone network, and calculating a feature representation of the first image sample through the first FPN backbone network;

Inputting the feature representation of the first image sample into the first region generation network, and generating an interesting region of the first image sample through the first region generation network;

Inputting the interesting region of the first image sample into the three-branch network, and performing an instance segmentation on the interesting region of the first image sample through the three-branch network to obtain an instance type, an instance box, and an instance mask of the first image sample;

Optimizing parameters of the instance segmentation model based on a backpropagation algorithm, according to the instance type and the label type of the first image sample, the instance box and the label box of the first image sample, and a difference between the instance mask and the label mask of the first image sample.

In a specific embodiment, the calculation of a feature representation of the first image sample through the first FPN backbone network includes:

Calculating intermediate feature representations of the first image sample based on the bottom-up sub-network of the first FPN backbone network, according to an order of calculation, the intermediate feature representations of the first image sample including a first sub-intermediate feature, a second sub-intermediate feature, a third sub-intermediate feature, and a fourth sub-intermediate feature;

Performing a dimensionality reduction calculation on the fourth sub-intermediate feature based on the top-down sub-network of the first FPN backbone network to obtain a fourth sub-feature;

Performing an up-sampling calculation on the fourth sub-feature according to a size of the third sub-intermediate feature, and performing a unit addition calculation on the third sub-intermediate feature and the up-sampled fourth sub-feature to obtain a third sub-feature;

Performing an up-sampling calculation on the third sub-feature according to a size of the second sub-intermediate feature, and performing a unit addition calculation on the second sub-intermediate feature and the up-sampled third sub-feature to obtain a second sub-feature;

Performing an up-sampling calculation on the second sub-feature according to a size of the first sub-intermediate feature, and performing a unit addition calculation on the first sub-intermediate feature and the up-sampled second sub-feature to obtain a first sub-feature, and combining the fourth sub-feature, the third sub-feature, the second sub-feature, and the first sub-feature to obtain the feature representation of the first image sample.

In a specific embodiment, the generation of an interesting region of the first image sample through the first region generation network includes:

Generating a plurality of intermediate interesting regions of the first image sample based on the RPN network; and normalizing sizes of the plurality of intermediate interesting regions of the first image sample by performing a bilinear interpolation calculations on each intermediate interesting region of the first image sample based on the RoIAlign network.

The RPN network is dedicated to recommending candidate regions and is a fully convolutional neural network.

In a specific embodiment, performing an instance segmentation on the interesting region of the first image sample through the three-branch network includes:

Performing an encoding calculation on the interesting region of the first image sample through a first RCNN branch in the three-branch network and obtaining the instance type;

Performing an encoding calculation on the interesting region of the first image sample through a second RCNN branch in the three-branch network and obtaining the instance box, a structure of the first RCNN branch being the same as a structure of the second RCNN branch;

Performing an encoding calculation on the interesting region of the first image sample through a mask branch in the three-branch network and obtaining the instance mask.

The structure of the RCNN branch may include a fully connected structure and a convolution structure. The first RCNN branch also includes a first fully connected structure for instance classification. The second RCNN branch also includes a second fully connected structure for instance box classification.

In block 104, constructing a score prediction model, the score prediction model including a second FPN backbone network sharing parameters and network structure with the first FPN backbone network, a second region generation network sharing parameters and network structure with the first region generation network, and a score prediction network.

The score prediction model includes the second FPN backbone network sharing parameters and network structure with the first FPN backbone network, and the second region generation network sharing parameters and network structure with the first region generation network. That is, when the parameters of the first FPN backbone network and the first area generation network are changed, the first area generating network, the changed parameters are updated to the second FPN backbone network and the second area generation network.

In block 105, training the score prediction model with the plurality of third image samples.

In a specific embodiment, the training of the score prediction model with the plurality of third image samples includes:

For each third image sample of the plurality of third image samples, inputting the third image sample into the second FPN backbone network, and calculating a feature representation of the third image sample through the second FPN backbone network;

Inputting the feature representation of the third image sample into the second region generation network, and generating an interesting region of the third image sample through the second region generation network;

Inputting the interesting region of the third image sample into the score prediction network, and performing a score prediction on the interesting region of the third image sample through the score prediction network to obtain a classification score, a box score, a mask score, and an instances number score, the third image sample includes a classification labeling score, a box labeling score, a mask labeling score, and an instance number labeling score;

Optimizing parameters of the score prediction network based on a backpropagation algorithm, according to the classification score and the classification labeling score, the box score and the box labeling score, the mask score and the mask labeling score, and the instance number score and the instance number labeling score.

The score prediction network may include a classification score prediction sub-network, a box score prediction sub-network, a mask score prediction sub-network, and an instance number score prediction sub-network. The classification score prediction sub-network, the box score prediction sub-network, and the mask score prediction sub-network all include a fully connected structure and a convolution structure. The instance number score prediction sub-network includes a convolution structure. Specifically, the box score prediction sub-network includes two fully connected layers and one convolutional layer. The mask score prediction sub-network includes two fully connected layers and one convolutional layer. The instance number score prediction sub-network includes one convolutional layer.

The classification score prediction sub-network is used to determine an uncertainty of the instance type of the third image sample predicted by the instance segmentation model. The box score prediction sub-network is used to determine an uncertainty of the instance box of the third image sample predicted by the instance segmentation model. The mask score prediction sub-network is used to determine an uncertainty of the instance mask of the third image sample predicted by the instance segmentation model. The instance number score prediction sub-network is used to predict the number of instances in the third image sample.

In block 106, calculating an information quantum score of the plurality of second image samples through the score prediction model.

In a specific embodiment, the calculation of an information quantum score of the plurality of second image samples through the score prediction model includes:

For each second image sample of the plurality of second image samples, calculating a classification score, a frame score, a mask score, and an instance number score of each instance in the second image sample through the score prediction model;

Calculating an information quantum score of each instance in the second image sample according to the classification score, the frame score, the mask score, and the instance number score of each instance in the second image sample;

Calculating an average of information quantum scores of all instance in the second image sample to obtain the information quantum score of the second image sample.

When the instance segmentation model outputs a predicted probability of the instance type of the second image sample, then the lower the confidence, the higher will be the classification score of the second image sample. When the instance segmentation model outputs the instance box of the second image sample, an intersection-over-union (IoU) of the instance box of the second image sample is calculated. The smaller the IoU of the instance box of the second image sample, the higher will be the box score of the second image sample. When the instance segmentation model outputs the instance mask of the second image sample, a Jaccard value of the instance mask of the second image sample is calculated. The greater the Jaccard value of the instance mask of the second image sample, the higher will be the mask score of the second image sample. When the score prediction model outputs a prediction probability of the instance number labeling score of the second image sample, then the lower the confidence, the higher will be the instance number score of the second image sample.

In block 107, extracting feature vectors of the plurality of second image samples.

In a specific embodiment, the extraction of feature vectors of the plurality of second image samples includes:

Extracting a feature representation of the second image sample through the second FPN backbone network, the feature representation of the second image sample including a plurality of sub-feature representations;

Performing a global average pooling on the plurality of sub-feature representations of the second image sample, and obtaining a plurality of pooled sub-feature representations;

Concatenating the plurality of pooled sub-feature representations;

Converting the concatenated sub-feature representations into the feature vectors.

In block 108, clustering the plurality of second image samples according to the feature vectors and obtaining a plurality of sample clusters out of the plurality of second image samples.

In a specific embodiment, the clustering of the plurality of second image samples according to the feature vectors includes:

Clustering the plurality of second image samples based on a Gaussian mixture model according to the feature vectors; or Clustering the plurality of second image samples based on a K-means model according to the feature vectors.

In a specific embodiment, the clustering of the plurality of second image samples based on a Gaussian mixture model according to the feature vectors includes:

Normalizing the feature vectors of the plurality of second image samples to obtain a plurality of target feature vectors;

Initializing Gaussian parameters, the Gaussian parameters including a mean vector, a covariance matrix, and a mixing coefficient;

Calculating the Gaussian parameters based on an expectation-maximization (EM) algorithm;

Determining the plurality of sample clusters of the plurality of second image samples according to the calculated Gaussian parameters.

In block 109, selecting a plurality of target image samples from the plurality of second image samples according to the information quantum score and the plurality of sample clusters.

In a specific embodiment, the selection of a plurality of target image samples from the plurality of second image samples according to the information quantum score and the plurality of sample clusters includes:

Acquiring a preset quantity;

For each sample cluster of the plurality of sample clusters, sorting the second image samples in the sample cluster from high to low according to the information quantum score;

Selecting the preset quantity of second image samples from the sample cluster in a high-to-low order of the information quantum score.

The method for selecting image samples of the embodiment one obtains a plurality of first image samples labeled with an instance, a plurality of second image samples yet to be labeled with an instance, and a plurality of third image samples labeled with a score, and constructs an instance segmentation model. The instance segmentation model includes a first FPN backbone network, a first region generation network, and a three-branch network. The instance segmentation model is trained with the plurality of first image samples. A score prediction model is constructed, and the score prediction model includes a second FPN backbone network sharing parameters and network structure with the first FPN backbone network, a second region generation network sharing parameters and network structure with the first region generation network, and a score prediction network. The score prediction model is trained with the plurality of third image samples. An information quantum score of the plurality of second image samples is calculated through the score prediction model. Feature vectors of the plurality of second image samples are extracted. The plurality of second image samples are clustered according to the feature vectors of the plurality of second image samples and a plurality of sample clusters of the plurality of second image samples are obtained. Target image samples are selected from the plurality of second image samples according to the information quantum score and the plurality of sample clusters. Embodiment one selects the target image samples from the image samples to be labeled, which improves an accuracy of sample selection.

In the first embodiment, a target image sample is selected from the image samples to be labeled to improve the accuracy of sample selection.

In another embodiment, the method for selecting image samples further includes:

Receiving user labels applied to the plurality of target image samples and obtaining a plurality of labeled target image samples;

Training the instance segmentation model with the plurality of labeled target image samples.

Embodiment Two

Figure 2:
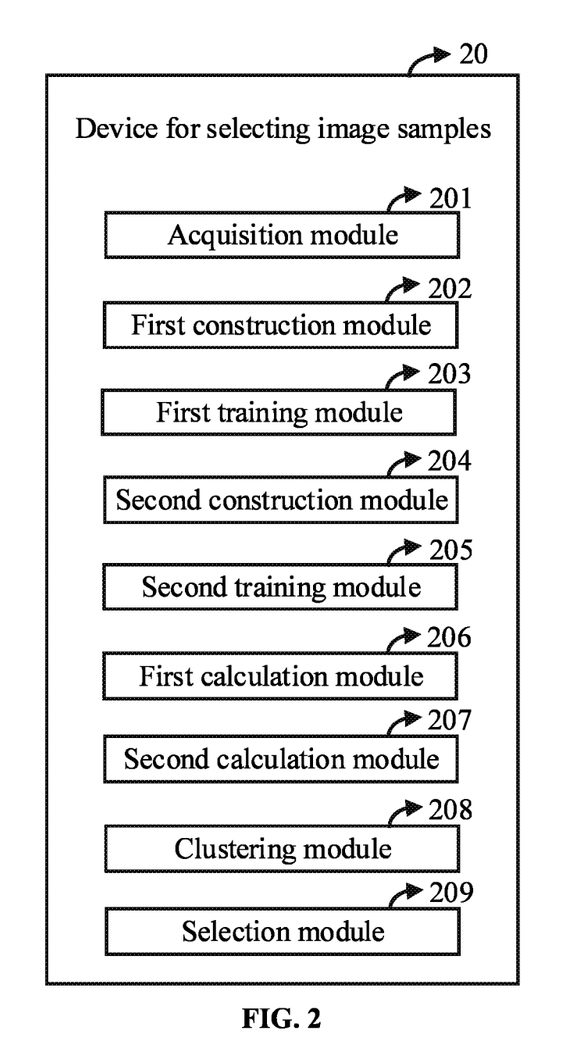
FIG. 2 shows a schematic structural diagram of a device for selecting image samples provided by an embodiment of the present disclosure.

FIG. 2 is a schematic structural diagram of a device for selecting image samples provided by an embodiment of the present disclosure. The device for selecting image samples 20 is installed in a computing device, and selects target image samples from image samples to be labeled, to improve an accuracy of sample selection.

As shown in FIG. 2, the device for selecting image samples 20 can include: an acquisition module 201, a first construction module 202, a first training module 203, a second construction module 204, a second training module 205, a first calculation module 206, a second calculation module 207, a clustering module 208, and a selection module 209.

The acquisition module 201 is configured to obtain a plurality of first image samples labeled with an instance, a plurality of second image samples yet to be labeled with an instance, and a plurality of third image samples labeled with a score.

The plurality of first image samples, the plurality of second image samples, and the plurality of third image samples can be read from a database.

The plurality of first image samples, the plurality of second image samples, and the plurality of third image samples uploaded by a user can be received.

A number of the plurality of first image samples is small, and unlabeled first image samples are not selected. When the plurality of first image samples are used for pre-training, a larger number of first image samples are required to achieve an acceptable training effect.

An instance labeling requires a labeler to apply a label to a label type, a label box, and a label mask of the first image sample.

A score labeling requires a labeler to label a classification labeling score, a box labeling score, a mask labeling score, and an instance number labeling score of the third image sample. The instance number labeling score is a number of instances in the third image sample.

The first construction module 202 is configured to construct an instance segmentation model, the instance segmentation model including a first feature pyramid networks backbone network, a first region generation network, and a three-branch network.

The feature pyramid networks (FPN) includes bottom-up sub-networks or top-down sub-networks. A bottom-up sub-network of the first FPN backbone network is used to perform feature extraction on images to obtain a plurality of image feature representations of different feature levels. A top-down sub-network of the first FPN backbone network is used to combine the plurality of image feature representations of different feature levels to calculate a feature representation of the image.

The first region generation network includes a region proposal network (RPN), a RoIAlign network, etc., and is used to generate region of interest (interesting region) of an image.

The first training module 203 is configured to train the instance segmentation model with the plurality of first image samples.

In a specific embodiment, the training of the instance segmentation model with the plurality of first image samples includes:
   For each first image sample of the plurality of first image samples, inputting the first image sample into the first FPN backbone network, and calculating a feature representation of the first image sample through the first FPN backbone network;
   Inputting the feature representation of the first image sample into the first region generation network, and generating an interesting region of the first image sample through the first region generation network;
   Inputting the interesting region of the first image sample into the three-branch network, and performing an instance segmentation on the interesting region of the first image sample through the three-branch network to obtain an instance type, an instance box, and an instance mask of the first image sample;
   Optimizing parameters of the instance segmentation model based on a backpropagation algorithm, according to the instance type and the label type of the first image sample, the instance box and the label box of the first image sample, and a difference between the instance mask and the label mask of the first image sample.

In a specific embodiment, the calculation of a feature representation of the first image sample through the first FPN backbone network includes:
   Calculating intermediate feature representations of the first image sample based on the bottom-up sub-network of the first FPN backbone network, according to an order of calculation, the intermediate feature representations of the first image sample including a first sub-intermediate feature, a second sub-intermediate feature, a third sub-intermediate feature, and a fourth sub-intermediate feature;
   Performing a dimensionality reduction calculation on the fourth sub-intermediate feature based on the top-down sub-network of the first FPN backbone network to obtain a fourth sub-feature;
   Performing an up-sampling calculation on the fourth sub-feature according to a size of the third sub-intermediate feature, and performing a unit addition calculation on the third sub-intermediate feature and the up-sampled fourth sub-feature to obtain a third sub-feature;
   Performing an up-sampling calculation on the third sub-feature according to a size of the second sub-intermediate feature, and performing a unit addition calculation on the second sub-intermediate feature and the up-sampled third sub-feature to obtain a second sub-feature;
   Performing an up-sampling calculation on the second sub-feature according to a size of the first sub-intermediate feature, and performing a unit addition calculation on the first sub-intermediate feature and the up-sampled second sub-feature to obtain a first sub-feature, and combining the fourth sub-feature, the third sub-feature, the second sub-feature, and the first sub-feature to obtain the feature representation of the first image sample.

In a specific embodiment, the generation of an interesting region of the first image sample through the first region generation network includes:
   Generating a plurality of intermediate interesting regions of the first image sample based on the RPN network; and normalizing sizes of the plurality of intermediate interesting regions of the first image sample by performing a bilinear interpolation calculations on each intermediate interesting region of the first image sample based on the RoIAlign network.

The RPN network is dedicated to recommending candidate regions and is a fully convolutional neural network.

In a specific embodiment, performing an instance segmentation on the interesting region of the first image sample through the three-branch network includes:
   Performing an encoding calculation on the interesting region of the first image sample through a first RCNN branch in the three-branch network and obtaining the instance type;
   Performing an encoding calculation on the interesting region of the first image sample through a second RCNN branch in the three-branch network and obtaining the instance box, a structure of the first RCNN branch being the same as a structure of the second RCNN branch;

Performing an encoding calculation on the interesting region of the first image sample through a mask branch in the three-branch network and obtaining the instance mask.

The structure of the RCNN branch may include a fully connected structure and a convolution structure. The first RCNN branch also includes a first fully connected structure for instance classification. The second RCNN branch also includes a second fully connected structure for instance box classification.

The second construction module 204 is configured to construct a score prediction model, the score prediction model including a second FPN backbone network sharing parameters and network structure with the first FPN backbone network, a second region generation network sharing parameters and network structure with the first region generation network, and a score prediction network.

The score prediction model includes the second FPN backbone network sharing parameters and network structure with the first FPN backbone network, and the second region generation network sharing parameters and network structure with the first region generation network. That is, when the parameters of the first FPN backbone network and the first area generating network are changed, the changed parameters are updated to the second FPN backbone network and the second area generation network.

The second training module 205 is configured to train the score prediction model with the plurality of third image samples.

In a specific embodiment, the training of the score prediction model with the plurality of third image samples includes:

For each third image sample of the plurality of third image samples, inputting the third image sample into the second FPN backbone network, and calculating a feature representation of the third image sample through the second FPN backbone network;

Inputting the feature representation of the third image sample into the second region generation network, and generating an interesting region of the third image sample through the second region generation network;

Inputting the interesting region of the third image sample into the score prediction network, and performing a score prediction on the interesting region of the third image sample through the score prediction network to obtain a classification score, a box score, a mask score, and an instances number score, the third image sample includes a classification labeling score, a box labeling score, a mask labeling score, and an instance number labeling score;

Optimizing parameters of the score prediction network based on a backpropagation algorithm, according to the classification score and the classification labeling score, the box score and the box labeling score, the mask score and the mask labeling score, and the instance number score and the instance number labeling score.

The score prediction network may include a classification score prediction sub-network, a box score prediction sub-network, a mask score prediction sub-network, and an instance number score prediction sub-network. The classification score prediction sub-network, the box score prediction sub-network, and the mask score prediction sub-network all include a fully connected structure and a convolution structure. The instance number score prediction sub-network includes a convolution structure. Specifically, the box score prediction sub-network includes two fully connected layers and one convolutional layer. The mask score prediction sub-network includes two fully connected layers and one convolutional layer. The instance number score prediction sub-network includes one convolutional layer.

The classification score prediction sub-network is used to determine an uncertainty of the instance type of the third image sample predicted by the instance segmentation model. The box score prediction sub-network is used to determine an uncertainty of the instance box of the third image sample predicted by the instance segmentation model. The mask score prediction sub-network is used to determine an uncertainty of the instance mask of the third image sample predicted by the instance segmentation model. The instance number score prediction sub-network is used to predict the number of instances in the third image sample.

The first calculation module 206 is configured to calculate an information quantum score of the plurality of second image samples through the score prediction model.

In a specific embodiment, the calculation of an information quantum score of the plurality of second image samples through the score prediction model includes:

For each second image sample of the plurality of second image samples, calculating a classification score, a frame score, a mask score, and an instance number score of each instance in the second image sample through the score prediction model;

Calculating an information quantum score of each instance in the second image sample according to the classification score, the frame score, the mask score, and the instance number score of each instance in the second image sample;

Calculating an average of information quantum scores of all instance in the second image sample to obtain the information quantum score of the second image sample.

When the instance segmentation model outputs a predicted probability of the instance type of the second image sample, then the lower the confidence, the higher will be the classification score of the second image sample. When the instance segmentation model outputs the instance box of the second image sample, an intersection-over-union (IoU) of the instance box of the second image sample is calculated. The smaller the IoU of the instance box of the second image sample, the higher will be the box score of the second image sample. When the instance segmentation model outputs the instance mask of the second image sample, a Jaccard value of the instance mask of the second image sample is calculated. The greater the Jaccard value of the instance mask of the second image sample, the higher will be the mask score of the second image sample. When the score prediction model outputs a prediction probability of the instance number labeling score of the second image sample, then the lower the confidence, the higher will be the instance number score of the second image sample.

The second calculation module 207 is configured to extract feature vectors of the plurality of second image samples.

In a specific embodiment, the extraction of feature vectors of the plurality of second image samples includes:

Extracting a feature representation of the second image sample through the second FPN backbone network, the feature representation of the second image sample including a plurality of sub-feature representations;

Performing a global average pooling on the plurality of sub-feature representations of the second image sample, and obtaining a plurality of pooled sub-feature representations;

Concatenating the plurality of pooled sub-feature representations;

Converting the concatenated sub-feature representations into the feature vectors.

The clustering module 208 is configured to cluster the plurality of second image samples according to the feature vectors and obtain a plurality of sample clusters out of the plurality of second image samples.

In a specific embodiment, the clustering of the plurality of second image samples according to the feature vectors includes:

Clustering the plurality of second image samples based on a Gaussian mixture model according to the feature vectors; or Clustering the plurality of second image samples based on a K-means model according to the feature vectors.

In a specific embodiment, the clustering of the plurality of second image samples based on a Gaussian mixture model according to the feature vectors includes:

Normalizing the feature vectors of the plurality of second image samples to obtain a plurality of target feature vectors;

Initializing Gaussian parameters, the Gaussian parameters including a mean vector, a covariance matrix, and a mixing coefficient;

Calculating the Gaussian parameters based on an expectation-maximization (EM) algorithm;

Determining the plurality of sample clusters of the plurality of second image samples according to the calculated Gaussian parameters.

The selection module 209 is configured to select a plurality of target image samples from the plurality of second image samples according to the information quantum score and the plurality of sample clusters.

In a specific embodiment, the selection of a plurality of target image samples from the plurality of second image samples according to the information quantum score and the plurality of sample clusters includes:

Acquiring a preset quantity;

For each sample cluster of the plurality of sample clusters, sorting the second image samples in the sample cluster from high to low according to the information quantum score;

Selecting the preset quantity of second image samples from the sample cluster in a high-to-low order of the information quantum score.

The device for selecting image samples 20 of the embodiment two obtains a plurality of first image samples labeled with an instance, a plurality of second image samples yet to be labeled with an instance, and a plurality of third image samples labeled with a score, and constructs an instance segmentation model. The instance segmentation model includes a first FPN backbone network, a first region generation network, and a three-branch network. The instance segmentation model is trained with the plurality of first image samples. A score prediction model is constructed, and the score prediction model includes a second FPN backbone network sharing parameters and network structure with the first FPN backbone network, a second region generation network sharing parameters and network structure with the first region generation network, and a score prediction network. The score prediction model is trained with the plurality of third image samples. An information quantum score of the plurality of second image samples is calculated through the score prediction model. Feature vectors of the plurality of second image samples are extracted. The plurality of second image samples are clustered according to the feature vectors of the plurality of second image samples and a plurality of sample clusters of the plurality of second image samples are obtained. Target image samples are selected from the plurality of second image samples according to the information quantum score and the plurality of sample clusters. Embodiment two selects the target image samples from the image samples to be labeled, which improves an accuracy of sample selection.

In the first embodiment, a target image sample is selected from the image samples to be labeled to improve the accuracy of sample selection.

In another embodiment, the first training module is also configured to receive user labels applied to the plurality of target image samples and obtain a plurality of labeled target image samples; and Train the instance segmentation model with the plurality of labeled target image samples.

Embodiment Three

A computer-readable storage medium having computer-readable instructions stored thereon in one embodiment is provided. The computer-readable storage medium may be non-volatile or volatile. The computer-readable instructions are executed by a processor to implement the steps in the above-mentioned method for selecting sample selection method embodiment, for example, steps 101-109 shown in FIG. 1:

In block 101, obtaining a plurality of first image samples labeled with an instance, a plurality of second image samples yet to be labeled with an instance, and a plurality of third image samples labeled with a score;

In block 102, constructing an instance segmentation model, the instance segmentation model including a first feature pyramid networks backbone network, a first region generation network, and a three-branch network;

In block 103, training the instance segmentation model with the plurality of first image samples;

In block 104, constructing a score prediction model, the score prediction model including a second FPN backbone network sharing parameters and network structure with the first FPN backbone network, a second region generation network sharing parameters and network structure with the first region generation network, and a score prediction network;

In block 105, training the score prediction model with the plurality of third image samples;

In block 106, calculating an information quantum score of the plurality of second image samples through the score prediction model;

In block 107, extracting feature vectors of the plurality of second image samples;

In block 108, clustering the plurality of second image samples according to the feature vectors and obtaining a plurality of sample clusters out of the plurality of second image samples;

In block 109, selecting a plurality of target image samples from the plurality of second image samples according to the information quantum score and the plurality of sample clusters.

Alternatively, the computer-readable instructions are executed by the processor to implement the functions of the modules in the foregoing device embodiments, such as modules 201-209 in FIG. 2:

The acquisition module 201 obtains a plurality of first image samples labeled with an instance, a plurality of second image samples yet to be labeled with an instance, and a plurality of third image samples labeled with a score;

The first construction module 202 constructs an instance segmentation model, and the instance segmentation model including a first feature pyramid networks backbone network, a first region generation network, and a three-branch network;

The first training module 203 trains the instance segmentation model with the plurality of first image samples;

The second construction module 204 constructs a score prediction model, the score prediction model includes a second FPN backbone network sharing parameters and network structure with the first FPN backbone network, a second region generation network sharing parameters and network structure with the first region generation network, and a score prediction network;

The second training module 205 trains the score prediction model with the plurality of third image samples;

The first calculation module 206 calculates an information quantum score of the plurality of second image samples through the score prediction model;

The second calculation module 207 extracts feature vectors of the plurality of second image samples;

The clustering module 208 clusters the plurality of second image samples according to the feature vectors and obtains a plurality of sample clusters out of the plurality of second image samples;

The selection module 209 selects a plurality of target image samples from the plurality of second image samples according to the information quantum score and the plurality of sample clusters.

Embodiment Four

Figure 3:
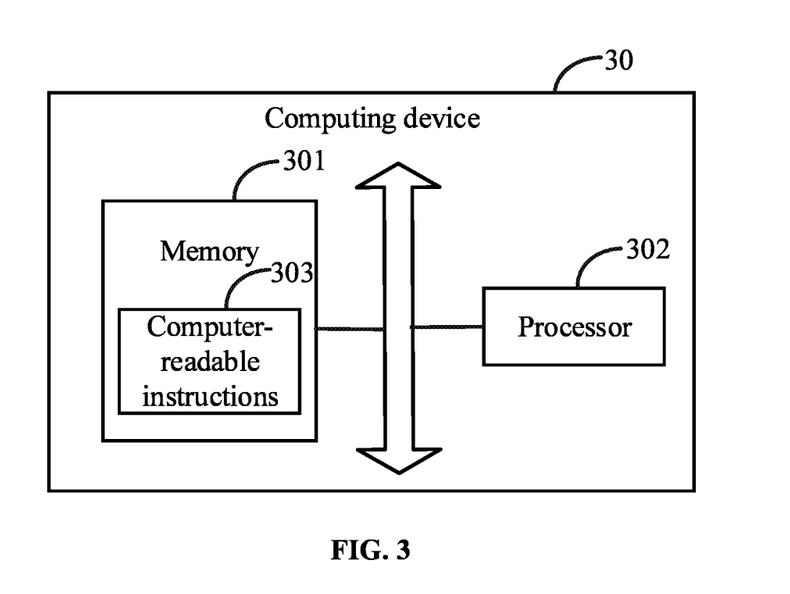
FIG. 3 shows a schematic structural diagram of a computing device provided by an embodiment of the present disclosure.

FIG. 3 is a schematic structural diagram of a computing device according to a fourth embodiment of the present disclosure. The computing device 30 includes a memory 301, a processor 302, and computer-readable instructions 303 stored in the memory 301 and running on the processor 302, such as an image sample selection program. The processor 302 executes the computer-readable instructions 303 to implement the steps in the embodiment of the method for selecting image samples described above, for example, steps 101-109 shown in FIG. 1:

In block 101, obtaining a plurality of first image samples labeled with an instance, a plurality of second image samples yet to be labeled with an instance, and a plurality of third image samples labeled with a score;

In block 102, constructing an instance segmentation model, the instance segmentation model including a first feature pyramid networks backbone network, a first region generation network, and a three-branch network;

In block 103, training the instance segmentation model with the plurality of first image samples;

In block 104, constructing a score prediction model, the score prediction model including a second FPN backbone network sharing parameters and network structure with the first FPN backbone network, a second region generation network sharing parameters and network structure with the first region generation network, and a score prediction network;

In block 105, training the score prediction model with the plurality of third image samples;

In block 106, calculating an information quantum score of the plurality of second image samples through the score prediction model;

In block 107, extracting feature vectors of the plurality of second image samples;

In block 108, clustering the plurality of second image samples according to the feature vectors and obtaining a plurality of sample clusters out of the plurality of second image samples;

In block 109, selecting a plurality of target image samples from the plurality of second image samples according to the information quantum score and the plurality of sample clusters.

Alternatively, the computer-readable instructions are executed by the processor to implement the functions of the modules in the foregoing device embodiments, such as modules 201-209 in FIG. 2:

The acquisition module 201 obtains a plurality of first image samples labeled with an instance, a plurality of second image samples yet to be labeled with an instance, and a plurality of third image samples labeled with a score;

The first construction module 202 constructs an instance segmentation model, the instance segmentation model including a first feature pyramid networks backbone network, a first region generation network, and a three-branch network;

The first training module 203 trains the instance segmentation model with the plurality of first image samples;

The second construction module 204 constructs a score prediction model, the score prediction model includes a second FPN backbone network sharing parameters and network structure with the first FPN backbone network, a second region generation network sharing parameters and network structure with the first region generation network, and a score prediction network;

The second training module 205 trains the score prediction model with the plurality of third image samples;

The first calculation module 206 calculates an information quantum score of the plurality of second image samples through the score prediction model;

The second calculation module 207 extracts feature vectors of the plurality of second image samples;

The clustering module 208 clusters the plurality of second image samples according to the feature vectors and obtains a plurality of sample clusters out of the plurality of second image samples;

The selection module 209 selects a plurality of target image samples from the plurality of second image samples according to the information quantum score and the plurality of sample clusters.

Exemplarily, the computer-readable instructions 303 can be divided into one or more modules and the one or more modules are stored in the memory 301 and executed by the processor 302 to run the method. The one or more modules may be a series of computer program instruction segments capable of completing specific functions, and the instruction segments are used to describe an execution process of the computer-readable instructions 303 in the computing device 30. For example, the computer-readable instructions 303 can be divided into the acquisition module 201, the first construction module 202, the first training module 203, the second construction module 204, the second training module 205, the first calculation module 206, the second calculation module 207, the clustering module 208, and the selection module 209 in FIG. 2. Embodiment two explains the specific functions of each module.

The computing device 30 can be a device such as a desktop computer, a notebook, a palmtop computer, and a cloud server. Those skilled in the art can understand that the schematic diagram 3 is only an example of the computing device 30, and does not constitute a limitation on the computing device 30. The computing device 30 may also include more or less components than those shown in the figure, or combine certain components, or have different components. For example, the computing device 30 may also include input and output devices, network access devices, buses, and so on.

The processor 302 can be a central processing units (CPU), other general processor, a digital signal processor (DSP), an application specific integrated circuits (ASIC), a Field-Programmable Gate Array (FPGA) or other programmable logic device, a discrete gate or a transistor logic device, a discrete hardware component, etc. The general processor can be a microprocessor or the processor 302 can also be any conventional processor, etc. The processor 302 is a control center of the computing device 30, using various interfaces and lines to connect various parts of the entire computing device 30.

The memory 301 can be used to store the computer-readable instructions 303, and the processor 302 executes or performers the computer-readable instructions or modules stored in the memory 301 and calls up data stored in the memory 301 to implement various functions of the computing device 30. The memory 301 mainly includes a storage program area and a storage data area. The storage program area may store an operating system, an application program required by at least one function (such as a sound playback function, an image playback function, etc.). The storage data area may store data and the like created in the use of the computing device 30. In addition, the memory 301 can include a hard disk, a memory, a plug-in hard disk, a smart media card (SMC), a secure digital (SD) card, a flash card, at least one magnetic disk storage device, a flash memory device, a read-only memory (ROM), a random access memory (RAM), or other non-volatile/volatile storage device.

If the integrated modules of the computing device 30 is implemented in a form of software function modules and sold or used as an independent product, it may be stored in a computer-readable storage medium. The computer-readable storage medium can be non-volatile or volatile. Based on this understanding, the implementation of all or part of the processes in the above-mentioned method embodiments can also be completed by instructing relevant hardware through computer-readable instructions. The computer-readable instructions can be stored in a computer-readable storage medium. When the computer-readable instructions are executed by the processor, the steps of the foregoing method embodiments can be implemented. The computer-readable instructions can be in a form of source codes, object codes, executable files, or some intermediate forms. The computer-readable storage medium can include any entity or device capable of carrying the computer-readable instructions, a recording medium, a U disk, a mobile hard disk, a magnetic disk, an optical disk, a read only memory (ROM), a random access memory (RAM).

In the several embodiments provided in the preset application, it should be understood that the disclosed system, device and method can be implemented in other ways. For example, the device embodiments described above are merely illustrative. For example, divisions of the modules are only a logical function division, and there can be other divisions in actual implementation.

The modules described as separate components may or may not be physically separated, and the components displayed as modules may or may not be physical units. That is, it or they can be located in one place, or distributed to a plurality of network units. Some or all of the modules can be selected according to actual needs to achieve the purpose of the solution of above embodiments.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above-mentioned integrated modules implemented in the form of software functional modules may be stored in a computer-readable storage medium. The above-mentioned software function module is stored in a storage medium, and includes several instructions to govern a computing device (which can be a personal computer, a server, or a network device, etc.) or a processor to execute part of the steps of the method for selecting image samples described in each embodiment of the present disclosure.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims only. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. A method for selecting image samples, the method comprising:
    obtaining a plurality of first image samples labeled with an instance, a plurality of second image samples yet to be labeled with an instance, and a plurality of third image samples labeled with a score;
    constructing an instance segmentation model, wherein the instance segmentation model comprises a first feature pyramid networks (FPN) backbone network, a first region generation network, and a three-branch network;
    training the instance segmentation model with the plurality of first image samples;
    constructing a score prediction model, wherein the score prediction model comprises a second FPN backbone network sharing parameters and network structure with the first FPN backbone network, a second region generation network sharing parameters and network structure with the first region generation network, and a score prediction network;

training the score prediction model with the plurality of third image samples;

calculating an information quantum score of the plurality of second image samples through the score prediction model;

extracting feature vectors of the plurality of second image samples;

clustering the plurality of second image samples according to the feature vectors and obtaining a plurality of sample clusters of the plurality of second image samples; and selecting a plurality of target image samples from the plurality of second image samples according to the information quantum score and the plurality of sample clusters.

2. The method for selecting image samples of claim 1, wherein the training the instance segmentation model with the plurality of first image samples comprises:

for each first image sample of the plurality of first image samples, inputting the first image sample into the first FPN backbone network, and calculating a feature representation of the first image sample through the first FPN backbone network;

inputting the feature representation of the first image sample into the first region generation network, and generating an interesting region of the first image sample through the first region generation network;

inputting the interesting region of the first image sample into the three-branch network, and performing an instance segmentation on the interesting region of the first image sample through the three-branch network to obtain an instance type, an instance box, and an instance mask of the first image sample; and optimizing parameters of the instance segmentation model based on a backpropagation algorithm, according to the instance type and a label type of the first image sample, the instance box and a label box of the first image sample, and a difference between the instance mask and a label mask of the first image sample.

3. The method for selecting image samples of claim 2, wherein the calculating a feature representation of the first image sample through the first FPN backbone network comprises:

calculating intermediate feature representations of the first image sample based on a bottom-up sub-network of the first FPN backbone network, according to an order of calculation, the intermediate feature representations of the first image sample comprising a first sub-intermediate feature, a second sub-intermediate feature, a third sub-intermediate feature, and a fourth sub-intermediate feature;

performing a dimensionality reduction calculation on the fourth sub-intermediate feature based on a top-down sub-network of the first FPN backbone network to obtain a fourth sub-feature;

performing an up-sampling calculation on the fourth sub-feature according to a size of the third sub-intermediate feature, and performing a unit addition calculation on the third sub-intermediate feature and the up-sampled fourth sub-feature to obtain a third sub-feature;

performing an up-sampling calculation on the third sub-feature according to a size of the second sub-intermediate feature, and performing a unit addition calculation on the second sub-intermediate feature and the up-sampled third sub-feature to obtain a second sub-feature; and performing an up-sampling calculation on the second sub-feature according to a size of the first sub-intermediate feature, performing a unit addition calculation on the first sub-intermediate feature and the up-sampled second sub-feature to obtain a first sub-feature, and combining the fourth sub-feature, the third sub-feature, the second sub-feature, and the first sub-feature to obtain the feature representation of the first image sample.

4. The method for selecting image samples of claim 2, the three-branch network comprising a first RCNN branch, a second RCNN branch, and a mask branch, wherein the performing an instance segmentation on the interesting region of the first image sample through the three-branch network comprises:

performing an encoding calculation on the interesting region of the first image sample through the first RCNN branch and obtaining the instance type;

performing an encoding calculation on the interesting region of the first image sample through the second RCNN branch and obtaining the instance box, a structure of the first RCNN branch being the same as a structure of the second RCNN branch; and performing an encoding calculation on the interesting region of the first image sample through the mask branch and obtaining the instance mask.

5. The method for selecting image samples of claim 1, wherein the training the score prediction model with the plurality of third image samples comprises:

for each third image sample of the plurality of third image samples, inputting the third image sample into the second FPN backbone network, and calculating a feature representation of the third image sample through the second FPN backbone network;

inputting the feature representation of the third image sample into the second region generation network, and generating an interesting region of the third image sample through the second region generation network;

inputting the interesting region of the third image sample into the score prediction network, and performing a score prediction on the interesting region of the third image sample through the score prediction network to obtain a classification score, a box score, a mask score, and an instances number score, the third image sample comprises a classification labeling score, a box labeling score, a mask labeling score, and an instance number labeling score; and optimizing parameters of the score prediction network based on a backpropagation algorithm, according to the classification score and the classification labeling score, the box score and the box labeling score, the mask score and the mask labeling score, and the instance number score and the instance number labeling score.

6. The method for selecting image samples of claim 5, wherein the clustering the plurality of second image samples according to the feature vectors includes:

clustering the plurality of second image samples based on a Gaussian mixture model according to the feature vectors; or clustering the plurality of second image samples based on a K-means model according to the feature vectors.

7. The method for selecting image samples of claim 1, wherein the calculating an information quantum score of the plurality of second image samples through the score prediction model comprises:
- for each second image sample of the plurality of second image samples, calculating a classification score, a frame score, a mask score, and an instance number score of each instance in the second image sample through the score prediction model;
- calculating an information quantum score of each instance in the second image sample according to the classification score, the frame score, the mask score, and the instance number score of each instance in the second image sample; and
- calculating an average of information quantum scores of all instance in the second image sample to obtain the information quantum score of the second image sample.

8. A computing device, comprising a processor, and the processor is configured to execute computer-readable instructions stored in a memory to implement the following steps:
- obtaining a plurality of first image samples labeled with an instance, a plurality of second image samples yet to be labeled with an instance, and a plurality of third image samples labeled with a score;
- constructing an instance segmentation model, wherein the instance segmentation model comprises a first feature pyramid networks (FPN) backbone network, a first region generation network, and a three-branch network;
- training the instance segmentation model with the plurality of first image samples;
- constructing a score prediction model, wherein the score prediction model comprises a second FPN backbone network sharing parameters and network structure with the first FPN backbone network, a second region generation network sharing parameters and network structure with the first region generation network, and a score prediction network;
- training the score prediction model with the plurality of third image samples;
- calculating an information quantum score of the plurality of second image samples through the score prediction model;
- extracting feature vectors of the plurality of second image samples;
- clustering the plurality of second image samples according to the feature vectors and obtaining a plurality of sample clusters of the plurality of second image samples; and
- selecting a plurality of target image samples from the plurality of second image samples according to the information quantum score and the plurality of sample clusters.

9. The computing device of claim 8, wherein the processor executes computer-readable instructions stored in the memory to implement the training of instance segmentation model with the plurality of first image samples, comprises:
- for each first image sample of the plurality of first image samples, inputting the first image sample into the first FPN backbone network, and calculating a feature representation of the first image sample through the first FPN backbone network;
- inputting the feature representation of the first image sample into the first region generation network, and generating an interesting region of the first image sample through the first region generation network;
- inputting the interesting region of the first image sample into the three-branch network, and performing an instance segmentation on the interesting region of the first image sample through the three-branch network to obtain an instance type, an instance box, and an instance mask of the first image sample; and
- optimizing parameters of the instance segmentation model based on a backpropagation algorithm, according to the instance type and a label type of the first image sample, the instance box and a label box of the first image sample, and a difference between the instance mask and a label mask of the first image sample.

10. The computing device of claim 9, wherein the processor executes computer-readable instructions stored in the memory to implement the calculating of a feature representation of the first image sample through the first FPN backbone network, comprises:
- calculating intermediate feature representations of the first image sample based on a bottom-up sub-network of the first FPN backbone network, according to an order of calculation, the intermediate feature representations of the first image sample comprising a first sub-intermediate feature, a second sub-intermediate feature, a third sub-intermediate feature, and a fourth sub-intermediate feature;
- performing a dimensionality reduction calculation on the fourth sub-intermediate feature based on a top-down sub-network of the first FPN backbone network to obtain a fourth sub-feature;
- performing an up-sampling calculation on the fourth sub-feature according to a size of the third sub-intermediate feature, and performing a unit addition calculation on the third sub-intermediate feature and the up-sampled fourth sub-feature to obtain a third sub-feature;
- performing an up-sampling calculation on the third sub-feature according to a size of the second sub-intermediate feature, and performing a unit addition calculation on the second sub-intermediate feature and the up-sampled third sub-feature to obtain a second sub-feature; and
- performing an up-sampling calculation on the second sub-feature according to a size of the first sub-intermediate feature, performing a unit addition calculation on the first sub-intermediate feature and the up-sampled second sub-feature to obtain a first sub-feature, and combining the fourth sub-feature, the third sub-feature, the second sub-feature, and the first sub-feature to obtain the feature representation of the first image sample.

11. The computing device of claim 9, the three-branch network comprising a first RCNN branch, a second RCNN branch, and a mask branch, wherein the processor executes computer-readable instructions stored in the memory to implement the performing of an instance segmentation on the interesting region of the first image sample through the three-branch network, comprises:
- performing an encoding calculation on the interesting region of the first image sample through the first RCNN branch and obtaining the instance type;
- performing an encoding calculation on the interesting region of the first image sample through the second RCNN branch and obtaining the instance box, a structure of the first RCNN branch being the same as a structure of the second RCNN branch; and performing an encoding calculation on the interesting region of the first image sample through the mask branch and obtaining the instance mask.

12. The computing device of claim 8, wherein the processor executes computer-readable instructions stored in the memory to implement the training of the score prediction model with the plurality of third image samples, comprises:
    for each third image sample of the plurality of third image samples, inputting the third image sample into the second FPN backbone network, and calculating a feature representation of the third image sample through the second FPN backbone network;
    inputting the feature representation of the third image sample into the second region generation network, and generating an interesting region of the third image sample through the second region generation network;
    inputting the interesting region of the third image sample into the score prediction network, and performing a score prediction on the interesting region of the third image sample through the score prediction network to obtain a classification score, a box score, a mask score, and an instances number score, the third image sample comprises a classification labeling score, a box labeling score, a mask labeling score, and an instance number labeling score; and
    optimizing parameters of the score prediction network based on a backpropagation algorithm, according to the classification score and the classification labeling score, the box score and the box labeling score, the mask score and the mask labeling score, and the instance number score and the instance number labeling score.

13. The computing device of claim 8, wherein the processor executes computer-readable instructions stored in the memory to implement the calculating of an information quantum score of the plurality of second image samples through the score prediction model, comprises:
    for each second image sample of the plurality of second image samples, calculating a classification score, a frame score, a mask score, and an instance number score of each instance in the second image sample through the score prediction model;
    calculating an information quantum score of each instance in the second image sample according to the classification score, the frame score, the mask score, and the instance number score of each instance in the second image sample; and
    calculating an average of information quantum scores of all instance in the second image sample to obtain the information quantum score of the second image sample.

14. The computing device of claim 8, wherein the processor executes computer-readable instructions stored in the memory to implement the clustering of the plurality of second image samples according to the feature vectors, comprises:
    clustering the plurality of second image samples based on a Gaussian mixture model according to the feature vectors; or
    clustering the plurality of second image samples based on a K-means model according to the feature vectors.

15. A computer-readable storage medium having stored computer-readable instructions thereon, wherein the computer-readable instructions implement the following steps when executed by a processor:
    obtaining a plurality of first image samples labeled with an instance, a plurality of second image samples yet to be labeled with an instance, and a plurality of third image samples labeled with a score;
    constructing an instance segmentation model, wherein the instance segmentation model comprises a first feature pyramid networks (FPN) backbone network, a first region generation network, and a three-branch network;
    training the instance segmentation model with the plurality of first image samples;
    constructing a score prediction model, wherein the score prediction model comprises a second FPN backbone network sharing parameters and network structure with the first FPN backbone network, a second region generation network sharing parameters and network structure with the first region generation network, and a score prediction network;
    training the score prediction model with the plurality of third image samples;
    calculating an information quantum score of the plurality of second image samples through the score prediction model;
    extracting feature vectors of the plurality of second image samples;
    clustering the plurality of second image samples according to the feature vectors and obtaining a plurality of sample clusters of the plurality of second image samples; and
    selecting a plurality of target image samples from the plurality of second image samples according to the information quantum score and the plurality of sample clusters.

16. The computer-readable storage medium of claim 15, wherein the computer-readable instructions are executed by the processor to implement the training of the instance segmentation model with the plurality of first image samples, comprises:
    for each first image sample of the plurality of first image samples, inputting the first image sample into the first FPN backbone network, and calculating a feature representation of the first image sample through the first FPN backbone network;
    inputting the feature representation of the first image sample into the first region generation network, and generating an interesting region of the first image sample through the first region generation network;
    inputting the interesting region of the first image sample into the three-branch network, and performing an instance segmentation on the interesting region of the first image sample through the three-branch network to obtain an instance type, an instance box, and an instance mask of the first image sample; and
    optimizing parameters of the instance segmentation model based on a backpropagation algorithm, according to the instance type and a label type of the first image sample, the instance box and a label box of the first image sample, and a difference between the instance mask and a label mask of the first image sample.

17. The computer-readable storage medium of claim 16, wherein the computer-readable instructions are executed by the processor to implement the calculating of a feature representation of the first image sample through the first FPN backbone network, comprises:
    calculating intermediate feature representations of the first image sample based on a bottom-up sub-network of the first FPN backbone network, according to an order of calculation, the intermediate feature representations of the first image sample comprising a first sub-intermediate feature, a second sub-intermediate feature, a third sub-intermediate feature, and a fourth sub-intermediate feature;

performing a dimensionality reduction calculation on the fourth sub-intermediate feature based on a top-down sub-network of the first FPN backbone network to obtain a fourth sub-feature;

performing an up-sampling calculation on the fourth sub-feature according to a size of the third sub-intermediate feature, and performing a unit addition calculation on the third sub-intermediate feature and the up-sampled fourth sub-feature to obtain a third sub-feature;

performing an up-sampling calculation on the third sub-feature according to a size of the second sub-intermediate feature, and performing a unit addition calculation on the second sub-intermediate feature and the up-sampled third sub-feature to obtain a second sub-feature; and performing an up-sampling calculation on the second sub-feature according to a size of the first sub-intermediate feature, performing a unit addition calculation on the first sub-intermediate feature and the up-sampled second sub-feature to obtain a first sub-feature, and combining the fourth sub-feature, the third sub-feature, the second sub-feature, and the first sub-feature to obtain the feature representation of the first image sample.

18. The computer-readable storage medium of claim 15, wherein the computer-readable instructions are executed by the processor to implement the training of the score prediction model with the plurality of third image samples, comprises:

for each third image sample of the plurality of third image samples, inputting the third image sample into the second FPN backbone network, and calculating a feature representation of the third image sample through the second FPN backbone network;

inputting the feature representation of the third image sample into the second region generation network, and generating an interesting region of the third image sample through the second region generation network;

inputting the interesting region of the third image sample into the score prediction network, and performing a score prediction on the interesting region of the third image sample through the score prediction network to obtain a classification score, a box score, a mask score, and an instances number score, the third image sample comprises a classification labeling score, a box labeling score, a mask labeling score, and an instance number labeling score; and optimizing parameters of the score prediction network based on a backpropagation algorithm, according to the classification score and the classification labeling score, the box score and the box labeling score, the mask score and the mask labeling score, the instance number score and the instance number labeling score.

19. The computer-readable storage medium of claim 15, wherein the computer-readable instructions are executed by the processor to implement the calculating of an information quantum score of the plurality of second image samples through the score prediction model, comprises:

for each second image sample of the plurality of second image samples, calculating a classification score, a frame score, a mask score, and an instance number score of each instance in the second image sample through the score prediction model;

calculating an information quantum score of each instance in the second image sample according to the classification score, the frame score, the mask score, and the instance number score of each instance in the second image sample; and calculating an average of information quantum scores of all instance in the second image sample to obtain the information quantum score of the second image sample.

20. The computer-readable storage medium of claim 15, wherein the computer-readable instructions are executed by the processor to implement the clustering of the plurality of second image samples according to the feature vectors, comprises:

clustering the plurality of second image samples based on a Gaussian mixture model according to the feature vectors; or clustering the plurality of second image samples based on a K-means model according to the feature vectors.

* * * * *